T. J. KELLY.
CLUTCH.
APPLICATION FILED JUNE 5, 1920.

1,384,324. Patented July 12, 1921.

Inventor
Thomas J. Kelly
By Spear, Middleton, Donaldson & Hall
Attorneys

UNITED STATES PATENT OFFICE.

THOMAS J. KELLY, OF ASHKUM, ILLINOIS.

CLUTCH.

1,384,324. Specification of Letters Patent. Patented July 12, 1921.

Application filed June 5, 1920. Serial No. 386,740.

*To all whom it may concern:*

Be it known that I, THOMAS J. KELLY, a citizen of the United States, and resident of Ashkum, in the county of Iroquois and State of Illinois, have invented certain new and useful Improvements in Clutches, of which the following is a specification.

This invention relates to a clutch for connecting shafting.

More specifically, my invention provides certain means whereby the clutch is automatically released when overloaded, regardless of the direction of rotation.

The object of my invention is to provide a clutch which may be adjusted to work under certain load conditions, but if overloaded, will release itself without attention, and without detriment to the attached shafting and mechanism.

Other objects and advantages will appear as the description proceeds and with reference to the accompanying drawings in which like reference characters refer to like parts throughout the several views of which:

Figure 1:
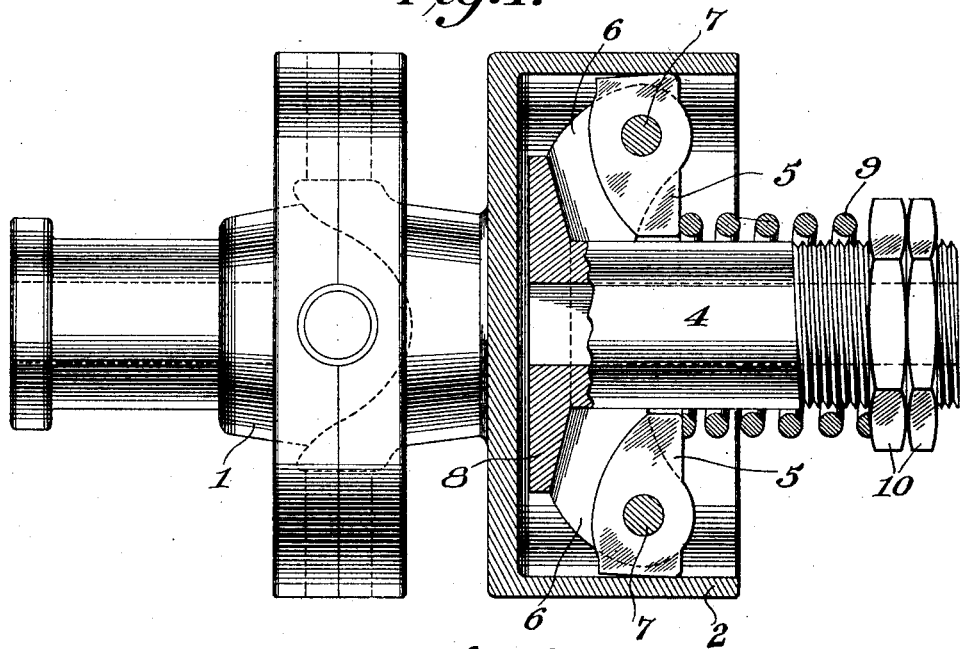
Figure 1 is a view partly in elevation and partly in section of one form of my device.
Figure 2:
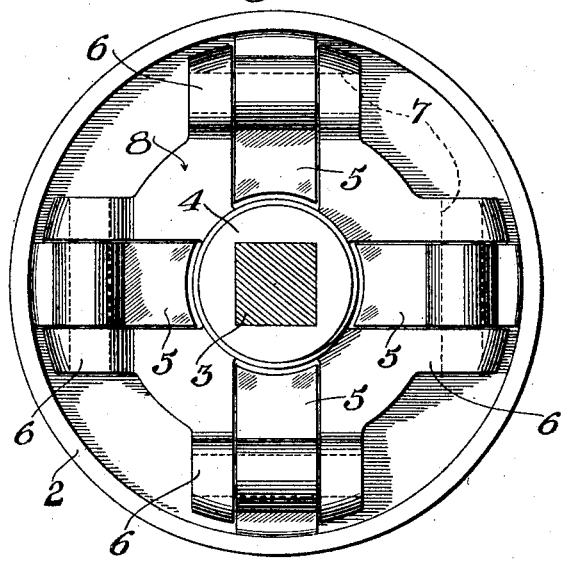
Fig. 2 is an end elevation of Fig. 1, with the tension spring and nut removed.

Any approved form of universal joint is shown at 1, suitably connected to shafting (not shown). Attached to this member is drum 2. A square shaft 3 carries a sleeve 4 located within the drum 2. Mounted on sleeve 4 are slotted lugs 6 carrying between them dogs 5 pivoted on pin 7. Disk 8 is formed integral with sleeve 4 and lugs 6 and serves as a brace.

Surrounding the sleeve and abutting one face of dogs 5 is a spring 9, the tension of which is adjusted by means of nuts 10.

In operation, the nuts 10 are adjusted so that the spring exerts the required pressure on dogs 5, which acting on their pivot form a frictional contact with the inner periphery of the drum 2. By this action, the two shafts are caused to revolve, and this tension is sufficient to carry the working load without slipping, but when this load approaches the breaking strain of the machine operated by the clutch, the dogs slip and thus through a partial release avoid detrimental effect to the machinery.

The advantages of this improved form of clutch will be readily apparent, as by use of the co-acting drum and dogs, a simple and efficient frictional contact is made. The tension spring and lock nuts allow various adjustments to be made to adapt the clutch to different working loads. It will also be seen that there will be practically no movement of the dogs, but merely a varying of the pressure against the inner face of drum 2.

Obviously a belt may be driven from the periphery of cylinder 2, shaft 4 being the drive shaft, or the driven mechanism may be remote from either universal joint 1 or shaft 4.

Having thus described my invention, what I claim and desire to secure by Letters Patent, is:

1. In combination with a shaft having a drum attached thereto, a second shaft extending within said drum, radially disposed pairs of lugs mounted on said second shaft, pivoted dogs carried between the lugs adapted to engage the inner periphery of said drum, and a spring acting against one face of said dogs.

2. The device of claim 1, said spring being coaxial with said second shaft.

In testimony whereof I affix my signature.

THOMAS J. KELLY.